(12) United States Patent
Kao et al.

(10) Patent No.: US 8,077,196 B2
(45) Date of Patent: Dec. 13, 2011

(54) STEREO PROJECTION OPTICAL SYSTEM

(75) Inventors: Chia-Hung Kao, Taipei Hsien (TW); Chien-Wen Hsu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 1039 days.

(21) Appl. No.: 11/952,970

(22) Filed: Dec. 7, 2007

(65) Prior Publication Data
US 2009/0058994 A1 Mar. 5, 2009

(30) Foreign Application Priority Data
Aug. 28, 2007 (CN) .......................... 2007 1 0201486

(51) Int. Cl.
*H04N 13/04* (2006.01)
*H04N 9/47* (2006.01)
(52) U.S. Cl. .......................................... 348/51; 348/54
(58) Field of Classification Search .................. None
See application file for complete search history.

(56) References Cited

U.S. PATENT DOCUMENTS

| | | | |
|---|---|---|---|
| 6,522,351 B1 | 2/2003 | Park | |
| 7,261,418 B2 * | 8/2007 | Ma et al. | 353/20 |
| 7,878,656 B2 * | 2/2011 | Hsu et al. | 353/20 |
| 2004/0066492 A1 | 4/2004 | Nakashima et al. | |
| 2005/0017938 A1 | 1/2005 | O'Donnell et al. | |
| 2007/0273836 A1 * | 11/2007 | Facius et al. | 353/20 |
| 2008/0180636 A1 * | 7/2008 | Boothroyd | 353/8 |
| 2008/0231953 A1 * | 9/2008 | Young | 359/495 |

FOREIGN PATENT DOCUMENTS

| | | |
|---|---|---|
| CN | 1625905 A | 6/2005 |
| TW | 200727006 | 7/2007 |

\* cited by examiner

*Primary Examiner* — John B. Walsh
(74) *Attorney, Agent, or Firm* — Altis Law Group, Inc.

(57) ABSTRACT

A stereo projection optical system, includes a first polarizing beam splitter configured for separating a light input into a first polarized light component and a second polarized light component; a first transmission-type spatial light modulator configured for receiving the first polarized light component; a second transmission-type spatial light modulator configured for receiving the second polarized light component; a second polarizing beam splitter positioned to receive the light outputs of the first, second spatial light modulators. The first and second transmission-type spatial light modulators respectively generate two images formed by the first polarized light component and the second polarized light component with spatial information. When a viewer wears glasses that have two polarizing lenses whose polarization directions are perpendicular to each other, the viewer can perceive projected images as being three-dimensional.

18 Claims, 5 Drawing Sheets

US 8,077,196 B2

STEREO PROJECTION OPTICAL SYSTEM

CROSS REFERENCE TO RELATED APPLICATION

This application is related to a co-pending U.S. patent application Ser. No. 11/947,086, entitled "STEREO PROJECTION OPTICAL SYSTEM", which was filed on Nov. 29, 2007 and is assigned to the same assignee as the present application. The disclosure of the above-identified application is incorporated herein by reference.

RELATED FIELD

The present invention relates generally to projection optical systems, and more specifically to a stereo projection optical system.

BACKGROUND

A conventional stereoscopic image display apparatus for displaying a stereoscopic image on a display screen as shown in FIG. 5, uses a pair of image signals generated by two video cameras 32, 33 located at a predetermined distance from an object 31 at with predetermined separation therebetween. The pair of image signals is then displayed on a single display screen 36 by two display devices, such as projectors, 34, 35, respectively, overlapping each other.

However, such conventional stereoscopic image display apparatus have drawbacks in that they require two separate display devices in order that two images, i.e., the left and right image, may be overlappingly displayed on a single display screen. This causes an increase in the size of the stereoscopic image display device and complicates its mechanical structure.

It is desired to provide a stereo projection optical system which can overcome the above-described deficiencies.

SUMMARY

In accordance with an exemplary embodiment, a stereo projection optical system, includes a first polarizing beam splitter, a first transmission-type spatial light modulator, a second transmission-type spatial light modulator and a second polarizing beam splitter. The first polarizing beam splitter is configured for separating a light input into a first polarized light component and a second polarized light component which is substantially orthogonal to the first polarized light component. The first transmission-type spatial light modulator is configured for receiving the first polarized light component and converting the first polarized light component into the second polarized light component and superimposing spatial information on it. The first transmission-type spatial light modulator emits the second polarized light component having spatial information. The second transmission-type spatial light modulator is configured for receiving the second polarized light component and converting the second polarized light component into the first polarized light component and superimposing spatial information on it. The second transmission-type spatial light modulator emits the first polarized light component having spatial information. The second polarizing beam splitter is positioned to receive the light outputs of the first, second spatial light modulators and configured for combining the first, second polarization light components respectively emitted by the first and second spatial light modulator into a single light output.

Other novel features and advantages will become more apparent from the following detailed description when taken in conjunction with the accompanying drawing.

BRIEF DESCRIPTION OF THE DRAWINGS

The present invention is described in detail hereinafter, by way of example and description of preferred and exemplary embodiments thereof and with reference to the accompanying drawings in which.

DETAILED DESCRIPTION OF THE PREFERRED EMBODIMENTS

A detailed explanation of a stereo projection optical system for projection displays according to each of various embodiments of the present invention will now be made with reference to the drawings attached hereto.

Figure 1:
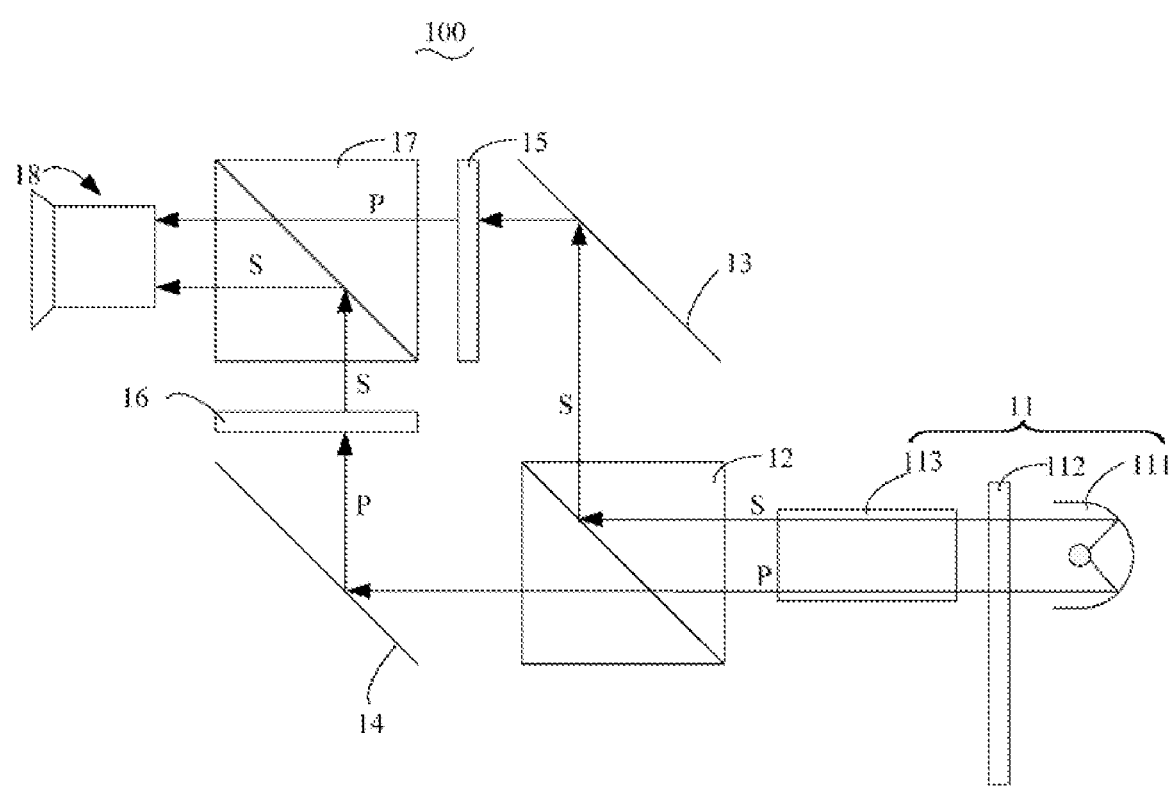
FIG. 1 illustrates one configuration of a stereo projection optical system in accordance with a first embodiment of the present invention.

Referring to FIG. 1, a stereo projection optical system 100 according to a first embodiment of the present invention is shown. The stereo projection optical system 100 includes a light source assembly 11, a first polarizing beam splitter (PBS) 12, a first and a second reflective apparatuses 13, 14, a first and a second transmission-type spatial light modulator (SLM) 15, 16, a second PBS 17, and a projecting lens 18.

The light source assembly 11 includes a light source 111, a color wheel 112 positioned to receive a light output of the light source 111 and a integrator 113 positioned to receive the light emerging from the color wheel 112. The light source 111 is configured for providing light beams for the stereo projection optical system 100 and can be a halogen lamp, a metal halogen lamp, a light emitting diode (LED), and the like. In the present embodiment, the light source 111 is a halogen lamp. The color wheel 112 is configured for splitting the light output from the light source 111 into time-sequenced red, green and blue light beams. The color wheel 112 includes red, green and blue color filters, and the center of the color wheel 112 is connected to a motor (not shown) such that the color wheel 112 is rotated. The integrator 113 is configured for adjusting the light beam from the color wheel 112 such that the light beams exiting the integrator 113 have a uniform spatial distribution.

The first PBS 12 is positioned to receive the light beams from the light source assembly 11, and is configured for splitting the non-polarized light beams of the light source assembly 11 into a first polarized light component and a second polarized light component which is substantially orthogonal to the first polarized light component. The first polarized light component can be S-polarized light or P-polarized light. In the present embodiment, the first polarized light component is S-polarized light, and the second polarized light component is P-polarized light. The first polarized light component is reflected sideways by the first PBS 12, and the second polarized light component is transmitted directly through the first PBS 12. The first PBS 12 can be a wire grid polarizer (WGP) or a polarizing beam splitter prism. In the present embodiment, the first PBS 12 is a polarizing beam splitter prism.

Figure 2:
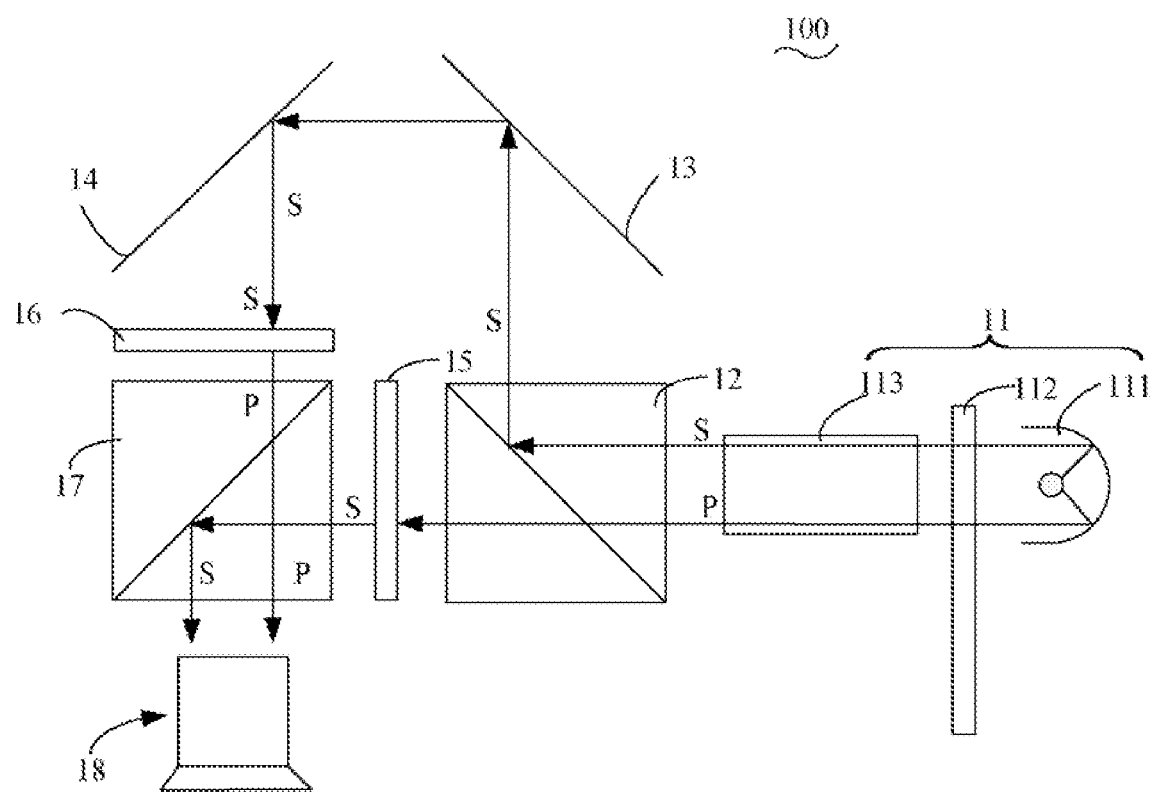
FIG. 2 illustrates another configuration of the stereo projection optical system of FIG. 1.

The first and second reflective apparatuses 13, 14 can be mirrors and are disposed between the first PBS 12 and the second PBS 17 and configured for reflecting the first and second polarized light component emitted from the first PBS 12 to the second PBS 17. It can be disposed in any one or more of the following positions: in the light path of one of the first and second polarized light components from the first PBS 12, in the light path of the first and second polarized light components of the first PBS 12. In the present embodiment, the first and second reflective apparatuses 13, 14 are respectively disposed in the light path of the first, second polarized light components. Referring to FIG. 2, another configuration of the stereo projection optical system 100 is shown.

Configurations and working principles of the first, second SLM 15, 16 are substantially same, thus, the first SLM 15 is presented only as an example to explain the configurations and working principles of the first, second SLMs 15, 16 in detail herein.

The first SLM 15 can be a liquid crystal display (LCD) and is positioned to receive the first polarized light component and configured for converting the first polarized light component in a predetermined manner into the second polarized light component and superimposing spatial information on the first polarization light component. The modified second polarized light component is emitted from the first transmission-type SLM 15.

The second SLM 16 is positioned to receive the second polarized light component from the first PBS 12. Similar to the first SLM 15, the second SLM 16 transmits the modified first polarized light component having spatial information.

The second PBS 17 is positioned to receive the emergent light beams from the first and second transmission-type SLMs 15, 16. Configurations and work principles of the second PBS 17 are substantially same as those of the first PBS 12. The second PBS 17 is configured for combining the first, second polarization light components respectively emitted by the first, second SLMs 15, 16 into a single light output. In particular, the second polarized light component passes directly through the second PBS 17, and the first polarized light component is reflected sideways by the second PBS 17 to become parallel to the second polarized light component effectively forming a single light output.

The projecting lens 18 is configured for receiving the light output of the second PBS 17, and magnifying the light output and projecting an image on a screen (not shown).

Figure 3:
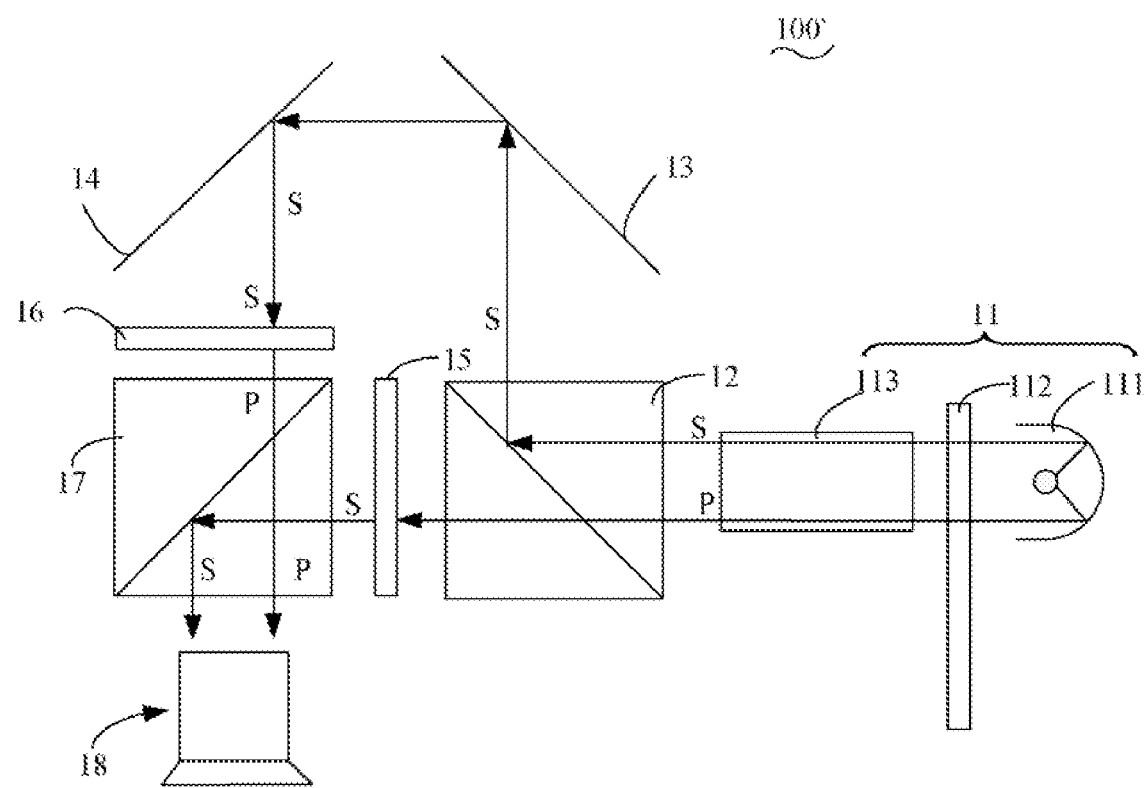
FIG. 3 is similar to FIG. 1, but further illustrates a plurality of analyzers disposed in the stereo projection optical system.

It should be understood that the stereo projection optical system 100 can also include a plurality of analyzers 19 in order to promote contrast of images projected by the stereo projection optical system 100. Referring to FIG. 3, this shows the analyzers 19 incorporated in a stereo projection optical system 100'. Each of the analyzers 19 can be a polarizer, which are configured for transmitting light of a predetermined polarization direction and blocking light of other polarization directions. In alternative embodiments, the analyzers 19 can have other desired light processing characteristics. One of the analyzer 19 is disposed between the first SLM 15 and the second PBS 17 and transmits P-polarized light and removes S-polarized light. Another analyzer 19 is disposed between the second transmission-type SLM 16 and the second PBS 17 and transmits S-polarized light and removes P-polarized light.

Figure 4:
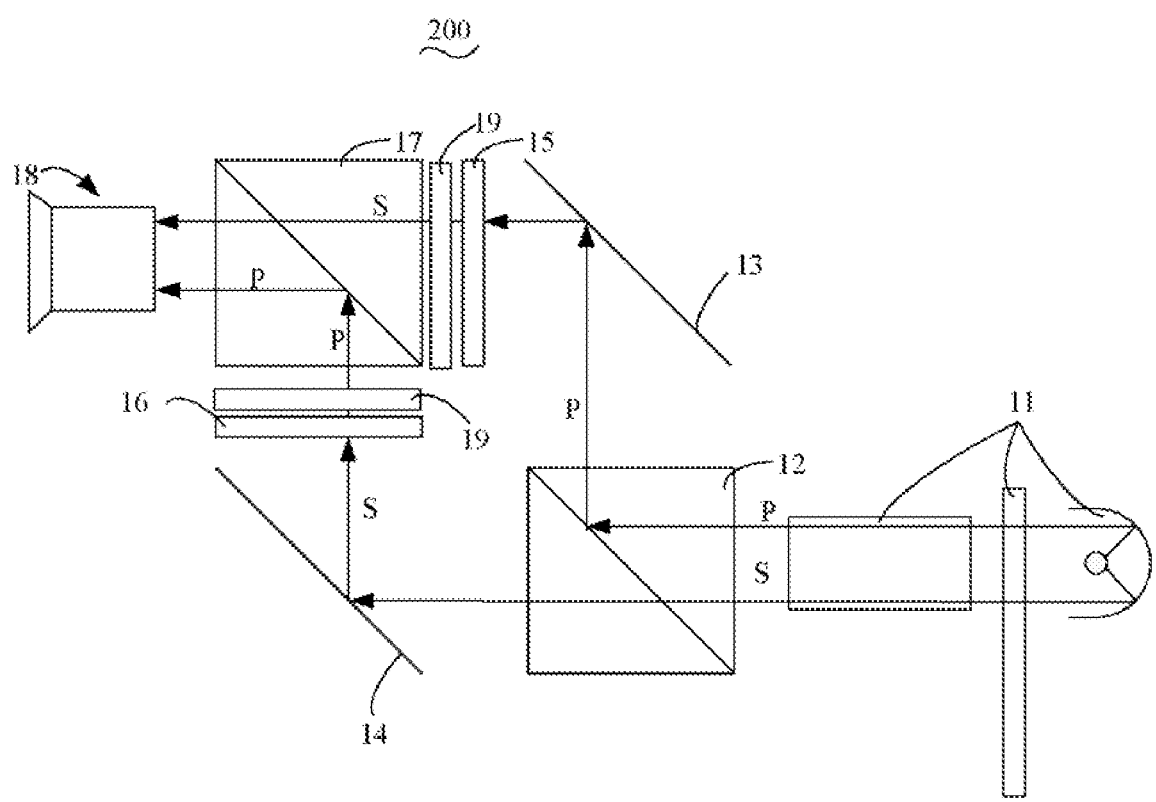
FIG. 4 illustrates a configuration of a stereo projection optical system in accordance with a second embodiment of the present invention.
Figure 5:
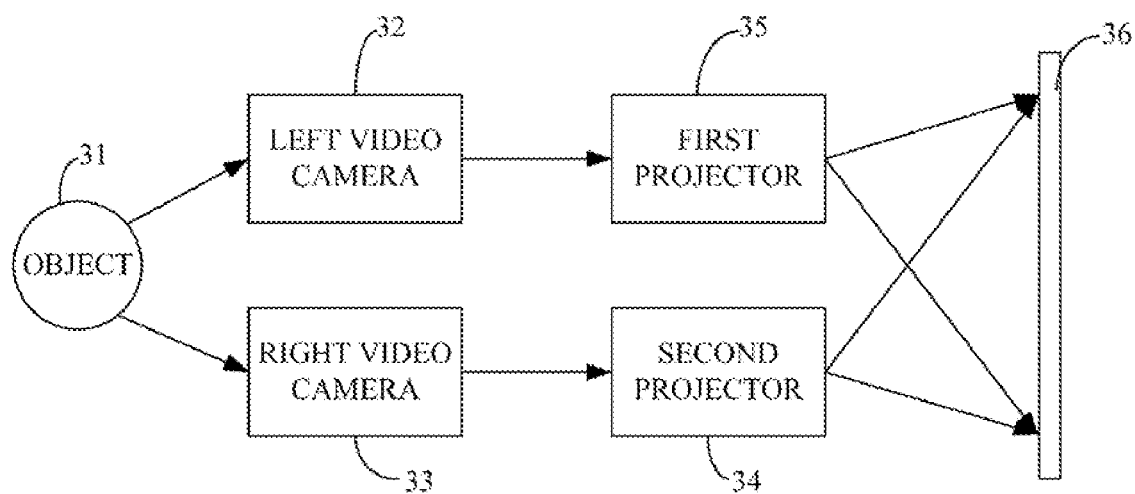
FIG. 5 illustrates a block diagram of a configuration of a convention stereoscopic projector.

Referring to FIG. 4, a stereo projection optical system 200 according to a second embodiment of the present invention is shown. The stereo projection optical system 200 is similar to the stereo projection optical system 100 of the first embodiment. However, the stereo projection optical system 200 includes a light source assembly 21, a first PBS 22, a first reflective apparatus 23, a second reflective apparatus 24, a first and a second transmission-type SLMs 25, 26, a second PBS 27, and a projecting lens 28.

The difference between the first embodiment and the second embodiment is that the first and second PBSs 21, and 27 each transmit S-polarized light and reflect P-polarized light. Other optical elements and light paths in the stereo projection optical system 200 are substantially the same as in the first embodiment.

The stereo projection optical system 200 includes a plurality of analyzers 29, in order to promote the contrast of the images projected by the stereo projection optical system 200. The location of the analyzers 29 is substantially the same as the analyzers 19 of the first embodiment. It should be understood that in alternative embodiment, any one, more or all of the analyzers 29 can be omitted.

In each of the above-described stereo projection optical system 100, 100', and 200, the first and second transmission-type SLMs respectively generate two images formed by the first polarized light component and the second polarized light component with spatial information. When a viewer wears glasses that have two polarizing lenses whose polarization directions are perpendicular to each other, the viewer can perceive projected images as being three-dimensional. From the foregoing, it will be apparent that the stereo projection optical system according to the present invention provides advantages in that its structure can be simplified with the reduction of its size by synthesizing lift and right image signals by displaying the stereoscopic image signal using a single projector.

It should be understood that the above-described embodiment are intended to illustrate rather than limit the invention. Variations may be made to the embodiments without departing from the spirit of the invention. Accordingly, it is appropriate that the appended claims be construed broadly and in a manner consistent with the scope of the invention.

What is claimed is:

1. A stereo projection optical system, comprising:
a first polarizing beam splitter configured for separating a light input into a first polarized light component and a second polarized light component which is substantially orthogonal to the first polarized light component;
a first transmission-type spatial light modulator configured for receiving the first polarized light component and converting the first polarized light component into the second polarized light component and emitting the second polarized light component;
a second transmission-type spatial light modulator configured for receiving the second polarized light component and converting the second polarized light component into the first polarized light component and emitting the first polarized light component; and
a second polarizing beam splitter positioned to receive the light outputs of the first, second spatial light modulators and configured for combining the first, second polarization light components respectively emitted by the first, second spatial light modulator into a single light output.

2. The stereo projection optical system as claimed in claim 1, wherein the first, and second polarizing beam splitters are wire grid polarizers.

3. The stereo projection optical system as claimed in claim 1, wherein the first, and second polarizing beam splitters are polarizing beam splitter prisms.

4. The stereo projection optical system as claimed in claim 1, wherein the first and second transmission-type spatial light modulators are liquid crystal displays.

5. The stereo projection optical system as claimed in claim 1, wherein the first polarized light component is one of S-polarized light and P-polarized light.

6. The stereo projection optical system as claimed in claim 5, wherein the second polarized light component is S-polarized light, the first polarized light component is P-polarized light.

7. The stereo projection optical system as claimed in claim 1, further comprising a projecting lens positioned to receive the emergent light of the second polarizing beam splitter and configured for magnifying and projecting an image.

8. The stereo projection optical system as claimed in claim 1, further comprising at least an analyzer disposed between the first polarizing beam splitter and the first, second transmission-type spatial light modulators.

9. The stereo projection optical system as claimed in claim 1, further comprising at least an analyzer disposed between the second polarizing beam splitter and the first, second transmission-type spatial light modulators.

10. The stereo projection optical system as claimed in claim 8, wherein the analyzer is a polarizer.

11. The stereo projection optical system as claimed in claim 9, wherein the analyzer is a polarizer.

12. The stereo projection optical system as claimed in claim 1, further comprising at least two reflective apparatuses disposed between an emergent light of the first polarizing beam splitter and an incident light of the second polarizing beam splitter and configured for coupling the emergent light of the first polarizing beam splitter into the second polarizing beam splitter.

13. The stereo projection optical system as claimed in claim 11, wherein the reflective apparatus is a mirror.

14. An optical system for use in a stereo projector, the optical system comprising:
  a light source assembly configured for emitting three time-sequenced primary color lights;
  a first polarized beam splitter positioned to receive the color lights and configured for separating the color lights into a first polarized light and a second polarized light, a polarization direction of the first polarized light being orthogonal to that of the second polarized light;
  a first transmission-type spatial light modulator positioned to receive the first polarized light, allowing the first polarized light passing therethrough, and configured for modulating the first polarized light with corresponding spatial information, the polarization direction of the modulated first polarized light being rotated to that of the second polarized light;
  a second transmission type spatial light modulator positioned to receive the second polarized light, allowing the second polarized light passing therethrough, and configured for modulating the second polarized light with corresponding spatial information, the polarization direction of the modulated second polarized light being rotated to that of the first polarized light;
  a second polarizing beam splitter positioned to receive and configured for combining the modulated first polarized light and the modulated second polarized light; and
  a projection lens positioned to receive and configured for projecting the combined modulated first and second polarized lights.

15. The optical system of claim 14, wherein the color lights travels along a first direction, the first polarized travels along a second direction substantially perpendicular to the first direction, the second polarized light travels along the first direction, the optical system further comprises a first mirror and a second mirror, the first mirror is positioned to redirect the first polarized light to travel along the first direction to the first transmission-type spatial light modulator, the second mirror is positioned to redirect the second polarized light to travel along the second direction to the second transmission-type spatial light modulator, and the second polarizing beam splitter is configured for redirecting the modulated second polarized light to travels along the first direction.

16. The optical system of claim 14, wherein the color lights travels along a first direction, the first polarized travels along a second direction substantially perpendicular to the first direction, the second polarized light travels along the first direction, the optical system further comprises a first mirror and a second mirror, the first mirror is positioned to redirect the first polarized light to travel along the first direction to the second mirror, the second mirror is positioned to redirect the first polarized light to travel along a third direction, which is opposite to the first direction, to the first transmission-type spatial light modulator, and the second polarizing beam splitter is configured for redirecting the modulated second polarized light to travels along the third direction.

17. The optical system of claim 14, wherein first transmission-type spatial light modulator is a transmission type liquid crystal display.

18. The optical system of claim 14, wherein second transmission-type spatial light modulator is a transmission type liquid crystal display.

* * * * *